United States Patent
Logunov et al.

(10) Patent No.: US 11,536,888 B2
(45) Date of Patent: Dec. 27, 2022

(54) LIGHT DIFFUSING DEVICE WITH COLOR CONVERSION AND RELATED LIGHT SYSTEM

(71) Applicant: CORNING INCORPORATED, Corning, NY (US)

(72) Inventors: Stephan Lvovich Logunov, Corning, NY (US); Manuela Ocampo, Corning, NY (US); Peter Gerard Wigley, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/045,021

(22) PCT Filed: Apr. 1, 2019

(86) PCT No.: PCT/US2019/025157
§ 371 (c)(1),
(2) Date: Oct. 2, 2020

(87) PCT Pub. No.: WO2019/195155
PCT Pub. Date: Oct. 10, 2019

(65) Prior Publication Data
US 2021/0141138 A1 May 13, 2021

Related U.S. Application Data

(60) Provisional application No. 62/651,324, filed on Apr. 2, 2018.

(51) Int. Cl.
*F21V 8/00* (2006.01)

(52) U.S. Cl.
CPC ........ *G02B 6/0003* (2013.01); *F21V 2200/10* (2015.01); *G02B 6/001* (2013.01)

(58) Field of Classification Search
CPC ... G02B 6/001; G02B 6/0003; F21V 2200/10; F21V 2200/15
See application file for complete search history.

(56) References Cited

U.S. PATENT DOCUMENTS 6,154,595 A * 11/2000 Yokogawa ......... G02B 6/02033
362/558
6,519,401 B1 * 2/2003 Imamura ................ G02B 6/001
385/123
9,025,923 B2 5/2015 Logunov et al.
(Continued)

FOREIGN PATENT DOCUMENTS

CN 204300983 U 4/2015
EP 2531572 A1 12/2012
(Continued)

OTHER PUBLICATIONS

English Machine Translation of WO 2014132473 provided by Espacenet (Year: 2014).*
(Continued)

*Primary Examiner* — Zheng Song
(74) *Attorney, Agent, or Firm* — Svetlana Short

(57) ABSTRACT

Embodiments of a light diffusing device with a color conversion layer are disclosed. Specifically the color conversion layer includes a luminophore that converts light from a higher wavelength to a lower wavelength.

19 Claims, 4 Drawing Sheets

(56) References Cited

U.S. PATENT DOCUMENTS

| | | |
|---|---|---|
| 9,857,515 B2 | 1/2018 | Tyagi |
| 2007/0104437 A1 | 5/2007 | Bookbinder et al. |
| 2009/0014055 A1* | 1/2009 | Beck .................. H01L 31/0504 |
| | | 136/246 |
| 2011/0122646 A1 | 5/2011 | Bickham et al. |
| 2012/0275180 A1 | 11/2012 | Button et al. |
| 2013/0088888 A1 | 4/2013 | Fewkes et al. |
| 2013/0090402 A1 | 4/2013 | Dewa et al. |
| 2013/0156391 A1 | 6/2013 | Logunov et al. |
| 2013/0308335 A1* | 11/2013 | Genier ...................... F21V 9/08 |
| | | 362/558 |
| 2013/0343703 A1* | 12/2013 | Genier ...................... G02B 6/32 |
| | | 264/1.27 |
| 2014/0198520 A1 | 7/2014 | Bennett et al. |
| 2014/0268815 A1* | 9/2014 | Li ........................ G02B 5/0247 |
| | | 359/599 |
| 2015/0062954 A1 | 3/2015 | Crossland et al. |
| 2015/0131306 A1* | 5/2015 | Genier ............... G02B 6/02052 |
| | | 362/553 |
| 2015/0131955 A1* | 5/2015 | Bennett .................... G02B 6/04 |
| | | 385/123 |
| 2016/0116660 A1* | 4/2016 | Benjamin .............. G02B 6/245 |
| | | 362/555 |
| 2016/0231585 A1* | 8/2016 | Bauco .................... H01S 5/0427 |
| 2020/0216356 A1 | 7/2020 | Logunov et al. |
| 2020/0257029 A1 | 8/2020 | Fewkes |

FOREIGN PATENT DOCUMENTS

| | | |
|---|---|---|
| EP | 2576725 A1 | 4/2013 |
| JP | 2004-200120 A | 7/2004 |
| WO | 2011/095915 A1 | 8/2011 |
| WO | 2011/147517 A1 | 12/2011 |
| WO | 2014/132473 A1 | 9/2014 |
| WO | 2017/087771 A1 | 5/2017 |

OTHER PUBLICATIONS

English Machine Translation of WO 2017087771 provided by Espacenet (Year: 2017).*
A.Endruweit et al., Spectroscopic experiments regarding the efficiency of side emission optical fibers in the UV-A and visible blue spectrum, Optics and Lasers in Engineering, 46 (2008), pp. 97-105. DOI:10.1016/j.optlaseng.2007.09.004.
Hsin-Tao Huang et al., Planar Lighting System Using Array of Blue LEDs to Excite Yellow Remote Phosphor Film, Journal of Display Technology, vol. 7, No. 1, Jan. 2011, pp. 44-51. DOI:10.1109/JDT.2010.2090339.
International Search Report and Written Opinion of the International Searching Authority; PCT/US19/25157; dated Jul. 1, 2019; 10 Pages; European Patent Office.

* cited by examiner

LIGHT DIFFUSING DEVICE WITH COLOR CONVERSION AND RELATED LIGHT SYSTEM

CROSS-REFERENCE TO RELATED APPLICATIONS

This application is a national stage application under 35 U.S.C. § 371 of International Application No. PCT/US2019/025157, filed on Apr. 1, 2019, which claims the benefit of priority under 35 U.S.C. § 119 of U.S. Provisional Application Ser. No. 62/651,324 filed on Apr. 2, 2018, the content of which is relied upon and incorporated herein by reference in its entirety.

BACKGROUND

The present disclosure relates generally to light diffusing devices for use in illumination applications, and, more particularly, to light diffusing devices having a color converting layer.

Light diffusing devices are available which direct light from a light source and distribute the light for area illumination. Light diffusing devices emit light outward along their length, thereby illuminating the device. Light sources capable of emitting electromagnetic radiation that is in the visible light range of wavelengths may be coupled to a light diffusing device to introduce light having different colors into the light diffusing device. Such colored light is then emitted outward from the sides or edges of the light diffusing device.

SUMMARY

One embodiment of the disclosure relates to a light diffusing optical fiber configured to be optically coupled to a light source and to generate an output light in response to input light received from the light source. The light diffusing optical fiber includes a core, a scattering layer surrounding the core and a light converting layer surrounding the scattering layer. The light converting layer includes a polymer matrix and a luminophore within the polymer matrix. The luminophore is configured to emit light in response to absorption of an input light, and the emitted light has a peak wavelength between 580 nm and 680 nm. A color of the output light as measured by the CIE 1931 x, y chromaticity space, comprises x from 0.55 to 0.75, y from 0.15 to 0.4.

Another embodiment of the disclosure relates to a light diffusing device. The light diffusing device includes a core formed from a silica-based glass, a scattering layer surrounding the core and a light converting layer surrounding the scattering layer. The light converting layer includes a polymer matrix and a luminophore. The luminophore is configured to emit light in response to absorption of an input light. A radial thickness of the light converting layer is 150 μm to 450 μm. The light converting layer comprises between 2.5 wt % and 15 wt % luminophore.

Another embodiment of the disclosure relates to a lighting system including a light source generating input light having a peak wavelength less than 500 nm. The lighting system includes a light diffusing optical fiber generating output light in response to the input light. The light diffusing optical fiber includes a core formed from a silica-based glass, a scattering layer surrounding the core and a light converting layer surrounding the scattering layer. The light converting layer includes a polymer matrix and a luminophore. The light diffusing optical fiber is optically coupled to the light source such that input light generated by the light source is carried to the light converting layer. The luminophore is configured to emit light in response to absorption of the input light, and the emitted light has a peak wavelength greater than the peak wavelength of the input light. A color of the output light as measured by the CIE 1931 x, y chromaticity space, comprises x from 0.55 to 0.75, y from 0.15 to 0.4.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of a light diffusing device, such as a light diffusing fiber (LDF), with a color converting layer and a related lighting system are shown and described. In general, the color converting optical fiber discussed herein includes a color converting layer that includes a luminophore (an atom or chemical compound that manifests luminescence, such as a variety of fluorophores and phosphors). In general, the luminophore used with the LDF disclosed herein is a material that converts light from a low wavelength light source to a higher wavelength output light. In specific embodiments disclosed herein, the light source is a blue or violet wavelength light source, and the color converting layer is configured to generate a lower wavelength output light, such as a red, orange or yellow output light.

Applicant has found that the arrangement discussed herein for producing lower wavelength output light (e.g., red, orange or yellow output light) has a number of surprising benefits as compared to other approaches for generating output light having these colors. First, Applicant has found the lighting system using the approach discussed herein is more reliable and has a longer life than a light system that uses a lower wavelength light source (e.g., a red pump laser diode). Applicant has found that lower wavelength light sources, such as blue or violet laser diodes, have much longer operation lifespans. Also these lower wavelength light sources typically operate at lower temperatures than red laser diodes, which improves energy efficiency, device lifespan and allows for lighting systems that utilize passive cooling systems.

In addition to these operation benefits, Applicant has found the lighting system utilizing the color converting layer disclosed herein provides a number of advantages related to the quality of output light. In particular, Applicant has found that, as compared to a lighting system that uses a low wavelength light source, the color converting LDF disclosed herein allows for more flexibility or broader access to the color space of the output light. In particular, by selecting various design parameters of the color converting layer (e.g., the thickness of the color converting layer, the amount of the luminophore material in the color converting layer, the type and amount of scattering material present in the color converting layer, the use of a filtering layer, etc.), a wide range of output colors can be produced. In contrast, configuring/selecting the light source to provide the desired color of the output light typically limits a system to a narrow range of colors that can be generated by light sources such as laser diodes. Further, the color conversion process discussed herein reduces or eliminates speckle pattern that is typically present in some light sources, such as laser diodes.

Figure 1:
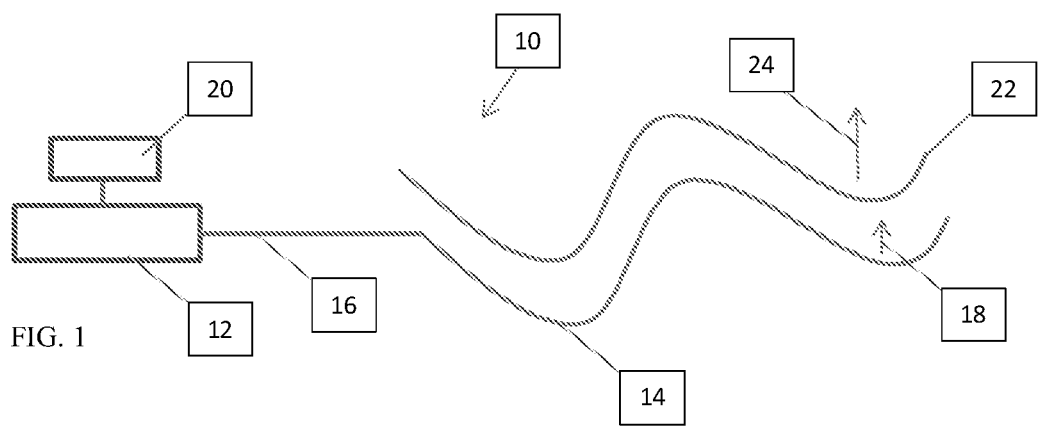
FIG. 1 is a schematic view of a lighting system including a light converting LDF, according to an exemplary embodiment.

Referring to FIG. 1, a lighting system 10 is shown according to an exemplary embodiment. Lighting system 10 includes a low wavelength light source, shown as laser diode 12, and a color converting light diffusing element or device, shown as LDF 14. In general, LDF 14 is optically coupled to laser diode 12, either directly or through an intermediate structure, such as optical fiber 16. In general and as will be explained in more detail below, laser diode 12 generates light (e.g., pump light or input light) at a relatively low wavelength, and the color converting layer of LDF 14 converts a substantial portion of the pump light to a higher wavelength, generating output light 18 that has a higher wavelength than the pump light from laser diode 12.

In specific embodiments, laser diode 12 generates light having a peak wavelength less than 500 nm, specifically between 350 nm and 500 nm and more specifically between 395 nm and 465 nm. In specific embodiments, laser diode 12 is a blue laser diode having a peak output wavelength between 440 nm and 460 nm. In specific embodiments, laser diode 12 is a blue laser diode having a peak output of 450 nm to 455 nm. In another specific embodiment, laser diode 12 is a violet laser diode having a peak output of between 400 nm and 410 nm and specifically of 405 nm. As will be discussed in more detail below regarding FIGS. 2 and 3, LDF 14 includes a color converting layer that converts this low wavelength input or pump light to an emitted light having a higher wavelength such that the output light from LDF 14 has a different color, such as red, yellow or orange.

In various embodiments, laser diode 12 may have a variety of powers and/or brightnesses. In specific embodiments, laser diode 12 has a power of between 20 mW and 10 W.

In various embodiments, lighting system 10 may include a passive cooling system 20 which cools laser diode 12. In contrast to a system that uses a high wavelength light source, such as a red laser diode, the lower operating temperature of the low wavelength laser diode 12 allows for cooling via a passive cooling system 20 improving the overall energy efficiency of lighting system 10.

In various embodiments, lighting system 10 may include a filtering device, layer or component 22. Filtering component 22 may be a colored sheet of material or a material layer surrounding or coating LDF 14 that absorbs light at a desired wavelength in order to alter the color of filtered output light 24 that a user sees exiting filtering component 22. As will be discussed below in relation to FIGS. 4A, 4B, 5A, 5B and 6, output light 18 may include an undesirable component, such as remaining (e.g., unconverted light) from the light source. In such embodiments, filtering component 22 may be utilized to remove such light components, generating filtered output light 24 of the desired color. In specific embodiments, filtering component 22 may be film, lens or other structure (e.g., the cover lens of tail light in an automotive application) placed between LDF 14 and a viewer. In other embodiments, filtering component 22 may be a filtering coating surrounding LDF 14.

In various embodiments, lighting system 10 may include multiple LDFs 14 driven by a single laser diode 12. In one such embodiment, lighting system 10 may include at least four LDFs having different color converting layers to generate RGYB output light from a single colored light source such as a 450 nm laser diode source or a 405 nm laser diode source. In other embodiments, lighting system 10 may include multiple LDFs 14 driven by multiple laser diodes 12.

In specific embodiments, lighting system 10 is an automotive lighting system. In specific embodiments, lighting system 10 is configured to generate a red light (e.g., for a tail light or brake light). In such embodiments, LDF 14 is configured to convert the input light to a red light, as discussed in more detail below, and in some such embodiments, filtering component 22 may be a lens or cover of a brake or tail light made from a red translucent polymer material, such as red acrylic. In another specific embodiment, lighting system 10 is configured to generate a yellow light (e.g., for turn signal light). In such embodiments, LDF 14 is configured to convert the input light to a yellow light, and in some such embodiments, filtering component 22 may be a lens or cover of a turn signal made from a yellow translucent polymer material, such as yellow acrylic.

Figure 2:
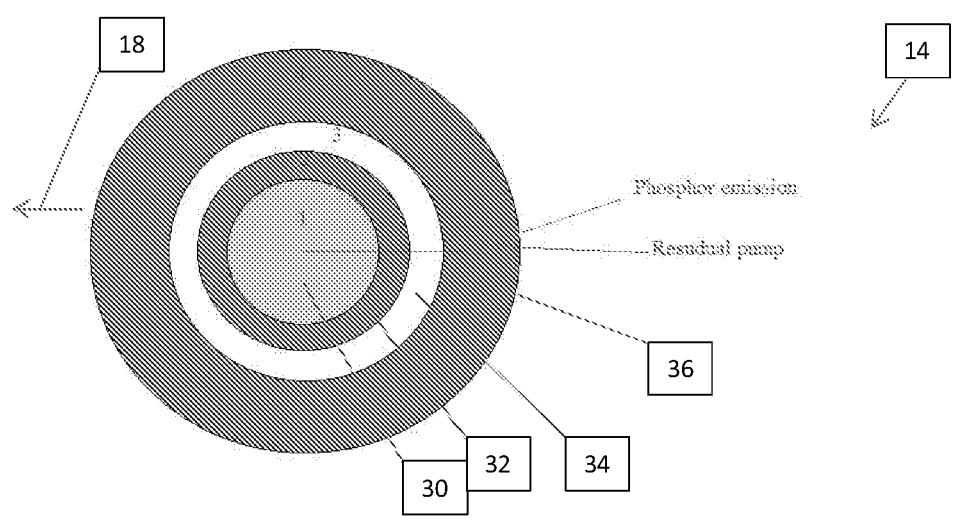
FIG. 2 is a cross-sectional view of the light converting LDF of FIG. 1, according to an exemplary embodiment.

Referring to FIG. 2, a longitudinal cross-sectional view (e.g., a view taken perpendicular to the longitudinal axis) of LDF 14 is shown. LDF 14 includes a core portion 30 having an outer radius of greater than 1 μm and less than 250 μm and specifically, of greater than 1 μm and less than 200 μm and more specifically of greater than 1 μm and less than 170 μm.

In some embodiments, core portion 30 includes structures (e.g., nano-structures, voids, nano-particles, etc.) that scatter light propagating in core portion 30 such that the light is directed radially outward from core portion 30, thereby illuminating LDF 14 and the space surrounding LDF 14. The scatter-induced attenuation may be controlled through increasing the concentration of voids, positioning voids throughout the fiber, or in cases where the voids are limited to an annular ring, increasing the width of the void-containing ring will also increase the scattering-induced attenuation for the same density of voids. Additionally, in compositions where the voids are helical, the scattering-induced attenuation may also be increased by varying the pitch of the helical voids over the length of the fiber. As discussed in more detail below these scattering structures may be located in layer 34, instead of or in addition to being located in core 30.

Still referring to FIG. 2, LDF 14 includes a layer 32 which surrounds and is in direct contact with core portion 30. Layer 32 is formed from a material which has a relatively low refractive index in order to increase the numerical aperture (NA) of LDF 14. In various embodiments, the numerical aperture of LDF 14 is greater than about 0.3, and in some embodiments greater than about 0.4. Layer 32 may include a low index polymeric material such as UV or thermally curable fluoroacrylate, such as PC452 available from SSCP Co. Ltd 403-2, Moknae, Ansan, Kyunggi, Korea, or silicone. Such low index polymer layers may have a relative refractive index that is negative relative to pure undoped silica. For example, the relative refractive index of the low index polymer material may be less than about −0.5%, or even less than about −1.0%. Also, layer 32 may include a high modulus material. Alternatively, layer 32 may include a silica glass. According to embodiments of the present disclosure, the silica glass in the cladding may be down-doped with a down-dopant, such as, for example, fluorine. As used herein, the term "down-dopant" refers to a dopant which has a propensity to lower the refractive index relative to pure undoped silica. Layer 32 generally has an index of refraction which is less than the index of refraction of the core portion 30.

Layer 32 generally extends from the outer radius of the core portion 30. The radial thickness of layer 32 may be greater than about 1.0 µm. For example, the radial thickness of layer 32 may be between about 5.0 µm and about 300 µm, such as less than about 200 µm. The radial thickness of layer 32 may also be, for example, between about 2.0 µm and about 100 µm, between about 2.0 µm and about 50 µm, between at least 2.0 µm and about 20 µm, or even between about 2.0 µm and about 12 µm. The radial thickness of layer 32 may be, for example, at least about 7.0 µm. In a specific embodiment, the radial thickness of layer 32 is such that the outer diameter measured at layer 32 is between 171 µm and 210 µm and more specifically is about 190 µm.

LDF 14 includes a secondary coating layer 34 which surrounds and is in direct contact with layer 32. Secondary coating layer 34 is doped with scattering particles, such as TiO$_2$, alumina, silica, or zirconia particles or any of the other scattering materials or structures discussed herein.

In various embodiments, the radial thickness of layer 34 may be greater than about 1.0 µm. For example, the radial thickness of layer 34 may be between 5.0 µm and 300 µm, such as less than 200 µm. The radial thickness of layer 34 may also be, for example, between 2.0 µm and 100 µm, between 2.0 µm and 50 µm, between at least 2.0 µm and 20 µm, or even between 2.0 µm and 12 µm. The radial thickness of layer 34 may be, for example, at least 7.0 µm. In a specific embodiment, the radial thickness of layer 34 is such that the outer diameter measured at layer 34 is between 200 µm and 260 µm and more specifically is about 230 µm.

In various embodiments, layer 34 is formed from a low modulus material that may be included to better protect the glass portions of the light-diffusing fiber by dissipating mechanical disturbances transmitted through the outer coating layers when the light-diffusing fiber is subjected to an external force. In one embodiment, layer 34 is the cured product of a composition that includes a curable crosslinker, a curable diluent, and a polymerization initiator. The composition may include one or more curable crosslinkers, one or more curable diluents, and/or one or more polymerization initiators. In one embodiment, the curable crosslinker is essentially free of urethane and urea functional groups. In various embodiments, layer 34 is formed from a polymer material different than the polymer material of layer 36, and in various embodiments, layer 34 has a lower refractive index than the color converting polymer layer 36.

LDF 14 further includes a color converting polymer layer 36 which surrounds and is in direct contact with layer 34. While FIG. 2 shows layer 36 as the outermost layer of LDF 14, it should be understood that embodiments of the present disclosure contemplate coated light diffusing devices having one or more additional coatings, for example protective coatings and/or light filtering coatings that surround the outer polymer coating layer 36.

In various embodiments, color converting polymer coating layer 36 includes a scattering material and a luminophore. Coating layer 36 may include a polymer material that may be any liquid polymer or prepolymer material into which a scattering composition (which includes the scattering material) and the luminophore could be added and in which the blend may be applied to the fiber as a liquid and then converted to a solid after application to the fiber. In some embodiments, coating layer 36 is formed from a thermo-polymer material. In other embodiments, coating layer 36 is formed from a polymer material such as an acrylate-based polymer or silicone-based polymer. In specific embodiments, the polymer matrix of layer 36 can be a wide variety of suitable materials including PVC, EVA and EVA copolymers such as Elvaloy or Elvax, fluorinated thermoplastics such as PFA, ETFE, PVDF, FEP, Tefzel, etc., polycarbonate, copolyesters such as Tritan, TPE thermoplastic elastomers such as Apolhya or Pebax or others.

In general, Applicant has determined that the type of luminophore material, the amount/concentration of luminophore material and/or the thickness of layer 36 can be selected to control the color of output light 18 from LDF 14. These aspects of layer 36 are particularly applicable to a lighting system utilizing a low wavelength (e.g., blue or violet laser diode) light source and a color converting LDF to produce red output light 18.

Figure 3:
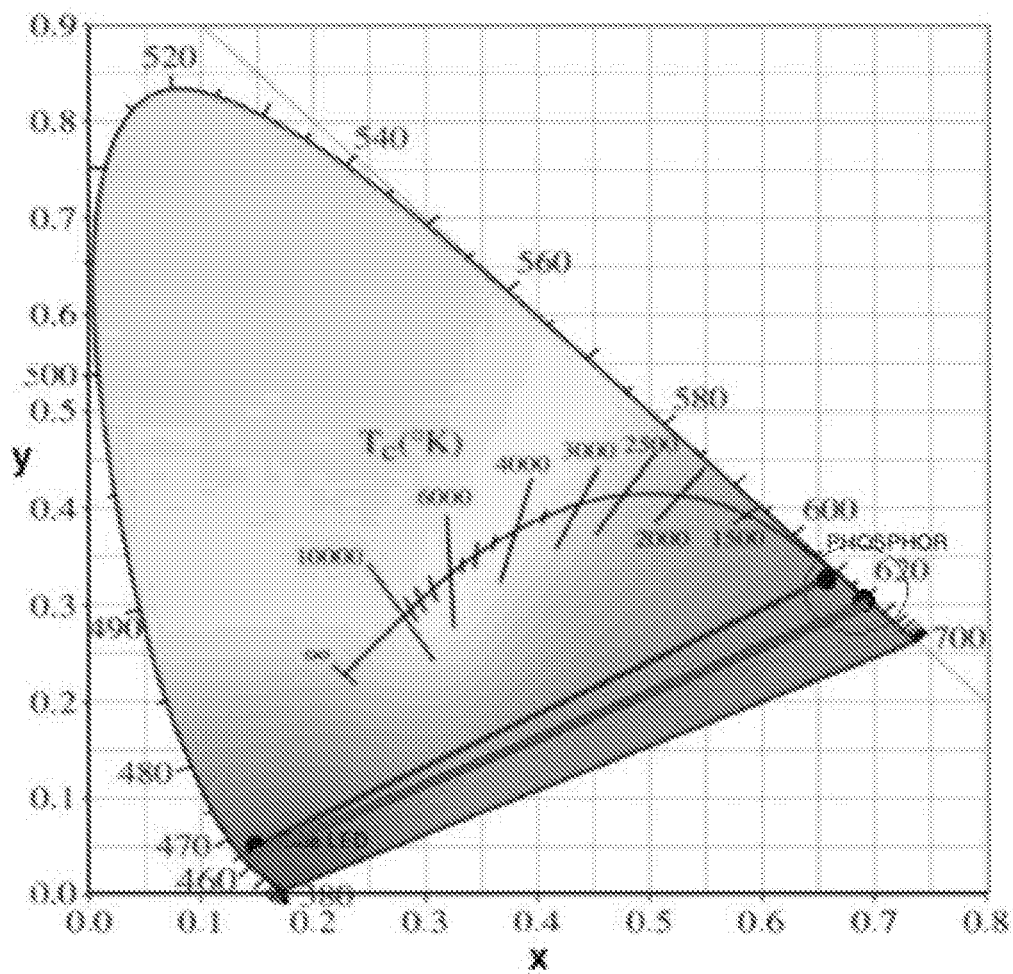
FIG. 3 shows the CIE color output of the LDF of FIG. 1, according to exemplary embodiments.

Referring to FIG. 3, a CIE color space is shown illustrating the color of output light 18 generated by LDF 14 as discussed herein. In various embodiments, based on a low wavelength input light source as discussed herein, layer 36 is configured to generate output light 18 having a color, as measured by the CIE 1931 x, y chromaticity space, having x from 0.55 to 0.75, y from 0.15 to 0.4. In various embodiments, based on a low wavelength input light source as discussed herein, layer 36 is configured to generate output light 18 having a color, as measured by the CIE 1931 x, y chromaticity space, having x from 0.6 to 0.73, y from 0.25 to 0.35.

In specific embodiments, to generate output light 18 having these CIE 1931 x, y chromaticity space coordinates, layer 36 generally includes a luminophore that emits light wave at peak wavelength between 580 nm and 680 nm and specifically between 600 nm and 640 nm. In specific embodiments, such luminophores may be a red phosphor material. In specific embodiments, the luminophore of layer 36 may be a nitride phosphor, an Eu doped phosphor or an Mn doped phosphor. In a specific embodiment, luminophore of layer 36 is nitride phosphor obtained from Dongtai Tianyuan Optoelectronic Technology Co., Ltd.

In addition, Applicant has found that the color profile of output light 18 can be varied by varying the amount of luminophore present in layer 36. In various embodiments, layer 36 includes between 2.5 vol % and 15 vol % luminophore (e.g., red phosphor), specifically between 7.5 vol % and 12.5 vol % luminophore (e.g., red phosphor), and more specifically 9.5 vol % to 10.5 vol % luminophore (e.g., red phosphor). In other embodiments, these percentages are weight percentages.

Figure 4A:
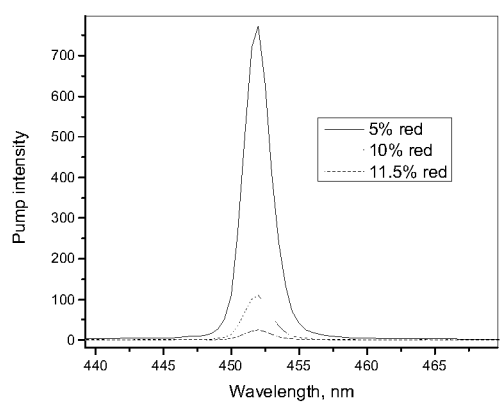
FIG. 4A shows the intensity of the pump light present in the LDF output light from the LDF of FIG. 1 when utilizing a 450 nm pump light and varying amounts of red phosphor in the light converting layer, according to an exemplary embodiment.
Figure 4B:
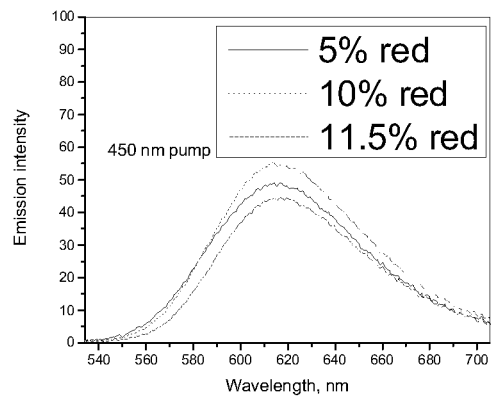
FIG. 4B shows the intensity of the red light in the LDF output light from the LDF of FIG. 1 when utilizing a 450 nm pump light and varying amounts of red phosphor in the light converting layer, according to an exemplary embodiment.

The effect on emission intensity of red phosphor percent in layer 36 is shown in FIGS. 4A, 4B, 5A and 5B. FIGS. 4A and 4B show pump light intensity and phosphor emission intensities, respectively, present in output light 18 for various red phosphor percentages when using a 450 nm laser diode input light source. As can be seen, around 10% red phosphor the amount of 450 nm source light present output light 18 is decreased substantially compared to 5% red phosphor, and the amount of red light is greater than with both 5% and 11.5% red phosphor. These plots demonstrate that as phosphor percentage increases, the amount of source light present in output light 18 decreases as greater percentages of source light are converted by the phosphor.

However, surprisingly, FIG. 4B demonstrates that beyond a certain point, increasing the percentage of red phosphor does not yield more red light in output light 18 (e.g., FIG. 4B shows that the amount of red light wavelength present in output light 18 is lowest for 11.5% red phosphor). Without being bound by theory, Applicant believes that beyond a certain point, additional red phosphor reabsorbs the red light produced, decreasing the overall efficiency of the conversion from the 450 nm source light to the output light. Further, FIGS. 4A and 4B demonstrate that by selecting phosphor % (along with thickness of the light converting layer as discussed below) light of various colors can be produced by "mixing" the amount of pump light and emitted light present in output light 18.

Figure 5A:
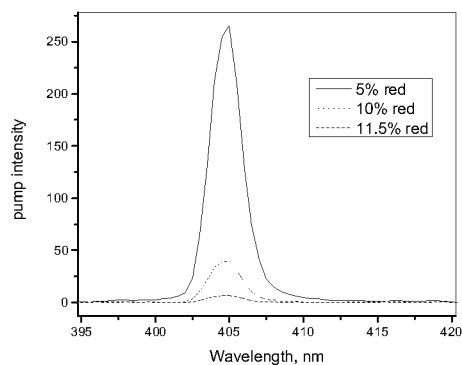
FIG. 5A shows the intensity of the pump light present in the LDF output light from the LDF of FIG. 1 when utilizing a 405 nm pump light and varying amounts of red phosphor in the light converting layer, according to an exemplary embodiment.
Figure 5B:
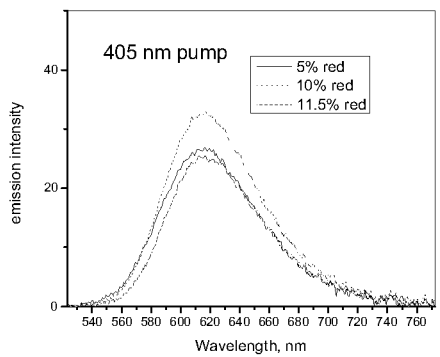
FIG. 5B shows the intensity of the red light in the LDF output light from the LDF of FIG. 1 when utilizing a 405 nm pump light and varying amounts of red phosphor in the light converting layer, according to an exemplary embodiment.

FIGS. 5A and 5B are similar to FIGS. 4A and 4B, and demonstrate that the same effects of phosphor percentage are observed when using a 405 nm light source.

Figure 6:
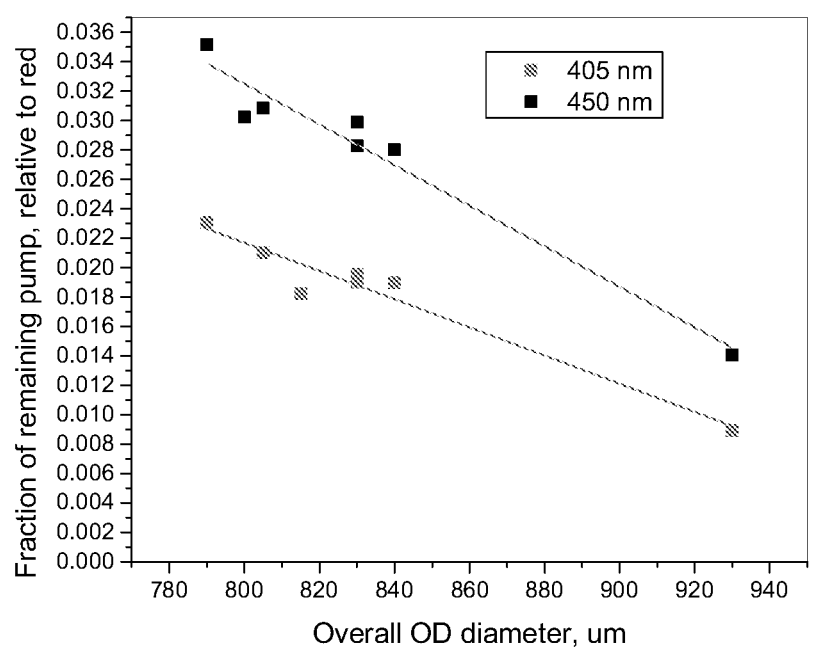
FIG. 6 is a plot showing the fraction of pump light in LDF output light as a function of coating thickness with 10% by volume of red phosphor and $TiO_2$ load by about 1.3%.

In addition to phosphor percentage, Applicant has determined that the thickness of layer 36 plays a role in controlling the color of output light 18. In various embodiments, to generate output light 18 having the CIE 1931 x, y chromaticity space coordinates discussed above, layer 36 has a thickness of 150-450 µm and more specifically 200-400 µm. Referring to FIG. 6, the percentage of pump light relative to the emitted red light present in LDF output light 18 is shown for varying thicknesses of layer 36. In FIG. 6, the variability of outer fiber diameter plotted along the x-axis is provided by varying the thickness of color converting layer 36. As can be seen in FIG. 6, for both 450 nm and 405 nm light sources, the fraction of input light present in output light 18 decreases as thickness of layer 36 increases. Thus, combined with luminophore percentage, thickness of layer 36 can also be selected to ensure output light 18 has the desired color.

As noted above, layer 36 may also include a scattering material dispersed throughout layer 36. While a variety of scattering particles may be utilized in layer 36, Applicant has determined that a scattering material used in a color converting LDF design may be selected based on compatibility with light source wavelength and/or emission wavelength. In particular, in specific embodiments, the scattering material used in layer 36 is selected to have a low level of absorption at the light source wavelength to increase the amount of source light available for absorption and conversion by the luminophore material in layer 36. In specific embodiments, Applicant has determined that zirconia and/or silica particles work well as a scattering material in layer 36 when a 405 nm light source is used because these materials are transparent to 405 nm light.

In various embodiments, the scattering material of layer 36 may include nano- or microparticles with an average diameter of from 200 nm to 10 µm. For example, the average diameter of the particles may be between 400 nm and 8.0 µm, or even between 100 nm and 6.0 µm. The nano- or microparticles may be particles of various high refractive index materials, such as, but not limited to, $TiO_2$, ZnO, $SiO_2$, BaS, MgO, $Al_2O_3$ or Zr. The concentration of the particles of the scattering material may vary along the length of the fiber or may be constant and may be a weight percent sufficient to provide even scattering of the light while limiting overall attenuation. The concentration of the particles of the scattering material may be greater than 0.5 wt. %. For example, the concentration of the particles of the scattering material may be greater than 1.0 wt. %, or greater than 1.25 wt. %, or greater than 1.5 wt. %, or greater than 2.0 wt. %, or greater than 2.5 wt. %, or greater than 3.0 wt. %, or greater than 3.5 wt. %, or even greater than 4.0 wt. %. The concentration of the particles of the scattering material may be between 0.5 wt. % and 10 wt. %, or between 1.0 wt. % and 10 wt. %, or between 1.25 wt. % and 7.5 wt. %, or between 1.25 wt. % and 6.0 wt. %, or between 1.5 wt. % and 10 wt. %, or between 1.5 wt. % and 7.5 wt. %, or between 1.5 wt. % and 6.0 wt. %, or between 2.0 wt. % and 10 wt. %, or between 2.0 wt. % and 7.5 wt. %, or even between 2.0 wt. % and 6.0 wt. %. The scattering material may also include nano- or microsized particles or voids of low refractive index, such as gas bubbles.

Coating layer 36 generally extends from the outer radius of layer 34. The radial thickness of coating layer 36 is 150 µm to 450 µm and more specifically is 200 µm to 400 µm. In a specific embodiment, layer 36 has a thickness of 200 µm, between 5 vol %-10 vol % red phosphor, and 1.3 wt % $TiO_2$. In specific test examples, Applicant has found that overall luminous efficiency with 450 nm pump for such LDF fibers was approximately 185 lm/W, and for 405 nm was approximately 188 lm/W.

Because coating layer 36 includes both a scattering material and a luminophore, coating layer 36 enhances the distribution and/or the nature of the light emitted radially from core portion 30 and converts light emitted radially from core portion 30 to a longer wavelength of light. Without wishing to be limited by any particular theory, it is believed that including both a scattering material and a luminophore in the same coating layer increases the path length of the input light within layer 36 independent of coating thickness, which in turn effectively reduces the thickness of the coating layer and allowing increased ability of the luminophore to absorb input light photons.

As noted above regarding FIG. 1, colored output light 18 can be emitted from LDF 14 having a polymer coating layer 36 in accordance with the present disclosure by coupling LDF 14 with a higher energy (lower wavelength) light source, such as a light source emitting at 405 nm, 450 nm or 455 nm peak wavelength. In general, the light source may be configured to emit light having a peak wavelength of between about 350 nm and about 550 nm, and more specifically between 400 nm and 460 nm. The light source may be, for example, a diode laser. The light from the light source is emitted from the core portion 30 and causes the luminophore to fluoresce or phosphoresce such that the wavelength of the light emitted from LDF 14 corresponds to a predetermined color. Where the luminophore includes a mixture of fluorescent or phosphorescent materials, the mixture may be modified and controlled such that the wavelength of the light emitted from LDF 14 corresponds to a predetermined color.

The fibers described herein may be formed utilizing various techniques. For example, core 30 can be made by any number of methods which incorporate voids or particles into the glass fiber. For example, methods for forming an optical fiber preform with voids are described in, for example, U.S. Patent Application Publication No. 2007/0104437 A1, which is incorporated in its entirety herein by reference. Additional methods of forming voids may be found in, for example, U.S. Patent Application Publication No. 2011/0122646 A1, U.S. Patent Application Publication No. 2012/0275180 A1, and U.S. Patent Application Publication No. 2013/0088888 A1, which are incorporated in their entirety herein by reference.

As mentioned above, the light diffusing element described above is a light diffusing fiber. As used herein, the term "light diffusing fiber" (LDF) refers to a flexible optical waveguide, such as an optical fiber, employing nano-sized structures that are utilized to scatter or diffuse light out of the sides of the fiber, such that light is guided away from the core of the waveguide and through the outer surfaces of the waveguide to provide illumination. Concepts relevant to the underlying principles of the claimed subject matter are disclosed in U.S. Patent Application Publication No. US 2011/0122646 A1, which is incorporated in its entirety herein by reference.

As used herein, the term "nano-structured fiber region" describes a region or area of a fiber with a large number of gas filled voids, or other nano-sized structures. The region or area may have, for example, more than 50 voids, or more than 100 voids, or even more than 200 voids in the cross-section of the fiber. The gas filled voids may contain, for example, $SO_2$, Kr, Ar, $CO_2$, $N_2$, $O_2$, or a mixture thereof. The cross-sectional size (e.g., diameter) of nano-sized structures (e.g., voids) as described herein may vary from about 10 nm to about 1.0 µm (for example, from about 50 nm to about 500 nm), and the length may vary from about 1.0 millimeter to about 50 meters (for example, from about 2.0 mm to about 5.0 meters, or from about 5.0 mm to about 1.0 meter).

LDF as described has good angular scattering properties (uniform dissipation of light away from the axis of the fiber) and good bending performance to avoid bright spots at fiber bends. A desirable attribute of at least some of the embodiments described herein is uniform and high illumination along the length of the fiber. Because the optical fiber is flexible, it allows a wide variety of the shapes to be deployed. The LDF described herein may have no bright spots (due to elevated bend losses) at the bending points of the fiber, such that the illumination provided by the fiber does not vary by more than about 40%. The variation of the illumination provided by the fiber may be less than about 30%, or less than about 20% or even less than about 10%. For example, in at least some embodiments, the average scattering loss of the fiber is greater than about 50 dB/km, and the scattering loss does not vary by more than about 40% (i.e., the scattering loss is within ±40% of the average scattering loss) over any given fiber segment having a length of about 0.2 meters. The average scattering loss of the fiber may be greater than about 50 dB/km with the scattering loss varying by less than about 40% over fiber segments having a length of less than about 0.05 meters. The average scattering loss of the fiber may be greater than about 50 dB/km with the scattering loss varying by less than about 40% over fiber segments having a length of about 0.01 meters. The average scattering loss of the fiber may also be greater than about 50 dB/km with the scattering loss varying by less than about 30%, or less than 20%, or even less than about 10%, over fiber segments having a length of about 0.01 meters.

According to embodiments of the present disclosure, the intensity variation of the integrated light intensity diffused through sides of the fiber at the illumination wavelength is less than about 40% for the target length of the fiber, which can be, for example, between about 0.02 meters to about 100 meters. The light diffusing fiber described herein may produce uniform illumination along the entire length of the fiber or uniform illumination along a segment of the fiber which is less than the entire length of the fiber. As used herein, the term "uniform illumination," means that the intensity of light emitted from the light diffusing fiber does not vary by more than 25% over the specified length.

LDF designs described herein include a nano-structured fiber region (region with nano-sized structures) placed in the core area of the fiber, or very close to the core. The LDF have scattering losses in excess of about 50 dB/km, for example, greater than about 100 dB/km, greater than about 200 dB/km, greater than about 300 dB/km, greater than about 325 dB/km, greater than about 500 dB/km, greater than about 1000 dB/km, greater than about 3000 dB/km, or even greater than about 5000 dB/km. The scattering loss, and thus illumination, or light radiated by the fiber, is uniform in angular space.

In order to reduce or to eliminate bright spots at bends in the fiber, it is desirable that the increase in attenuation at a 90° bend in the fiber is less than about 5.0 dB/turn, for example, less than about 3.0 dB/turn, less than about 2.0 dB/turn, or even less than about 1.0 dB/turn when the bend diameter is less than about 50 mm. In exemplary embodiments, these low bend losses are achieved at even smaller bend diameters, for example, at bend diameters of less than about 20 mm, less than about 10 mm, or even less than about 5.0 mm. The total increase in attenuation may be less than about 1.0 dB per 90 degree turn at a bend radius of about 5.0 mm.

The bending loss is equal to or is less than the intrinsic scattering loss from the core of the straight fiber. The intrinsic scattering is predominantly due to scattering from the nano-sized structures. Thus, according to at least the bend insensitive embodiments of theoptical fiber, the bend loss does not exceed the intrinsic scattering of the fiber. However, because scattering level is a function of bending diameter, the bending deployment of the fiber depends on its scattering level. For example, the fiber may have a bend loss of less than about 3.0 dB/turn, or even less than about 2.0 dB/turn, and the fiber can be bent in an arc with a radius as small as about 5.0 mm without forming bright spots.

While the disclosure relates primarily to a color converting light diffusing fiber, in other embodiments lighting system 10 may utilize other types of light diffusing elements utilizing the color converting materials and other structures discussed herein. For example, the light diffusing element of lighting system 10 may be an LED, electroluminescence wire, light diffusing or side-emitting optical fiber having various characteristics, or any other device that emits light outward from the device. In such embodiments, the light diffusing element includes one or more structures or layers including a color converting luminophore.

For example in embodiments where the light diffusing element is a side-emitting optical fiber, the side-emitting optical fiber may include a plastic or a glass core and a cladding surrounding and in direct contact with the core, where the cladding formed from a material having a lower refractive index than the material of the core. For example, the fiber may include a core formed from Poly(methyl methacrylate) (PMMA) and a cladding formed from fluorinated polymers. Similarly, the fiber may include a glass core and a cladding formed from fluorinated polymers. The fiber may also include a glass core and glass cladding where the refractive index of at least one of the core glass and the cladding glass is modified so that the cladding has a lower refractive index than the core. Side-emitting optical fiber also includes scattering defects. The core region may be doped with small refractive and/or reflective light-scattering particles during manufacture. Alternatively, the surface of the core may be modified or treated to have surface features ("defects") that scatter light out of the core. Some examples of light-emitting surface defects include serrations, notches, scratches, texture, roughness, corrugations, etching, abrasion, etc. The entire length of fiber can be modified or treated to have side-emitting properties, or just a portion of the fiber, for example, a portion along the length or circumference of the fiber, or both.

Aspect (1) of this disclosure pertains to a light diffusing optical fiber configured to be optically coupled to a light source and to generate an output light in response to input light received from the light source, the light diffusing optical fiber comprising: a core; a scattering layer surrounding the core; and a light converting layer surrounding the scattering layer, the light converting layer comprising a polymer matrix and a luminophore within the polymer matrix; wherein the luminophore is configured to emit light in response to absorption of an input light, the emitted light having a peak wavelength between 580 nm and 680 nm; wherein a color of the output light as measured by the CIE 1931 x, y chromaticity space, comprises x from 0.55 to 0.75, y from 0.15 to 0.4.

Aspect (2) pertains to the light diffusing optical fiber of Aspect (1), wherein the emitted light has a peak wavelength between 600 nm and 640 nm, and color of the output light as measured by the CIE 1931 x, y chromaticity space, comprises x from 0.6 to 0.73, y from 0.25 to 0.35.

Aspect (3) pertains to the light diffusing optical fiber of Aspect (1) or Aspect (2), wherein the light converting layer has a radial thickness of 150 µm to 450 µm.

Aspect (4) pertains to the light diffusing optical fiber of Aspect (1) or Aspect (2), wherein the light converting layer has a radial thickness of 200 µm to 400 µm.

Aspect (5) pertains to the light diffusing optical fiber of any one of Aspects (1) through (4), wherein the luminophore is a nitride phosphor material.

Aspect (6) pertains to the light diffusing optical fiber of any one of Aspects (1) through (5), wherein the light converting layer comprises between 2.5 vol % and 15 vol % luminophore.

Aspect (7) pertains to the light diffusing optical fiber of any one of Aspects (1) through (5), wherein the light converting layer comprises 5-10 vol % luminophore.

Aspect (8) pertains to the light diffusing optical fiber of any one of Aspects (1) through (7), wherein the light converting layer comprises a scattering material dispersed within the polymer matrix.

Aspect (9) pertains to the light diffusing optical fiber of Aspect (8), wherein the scattering material of the light converting layer comprises a plurality of particles within the polymer matrix.

Aspect (10) pertains to the light diffusing optical fiber of Aspect (9), wherein the particles comprise at least one of $TiO_2$, ZnO, $SiO_2$, BaS, MgO, $Al_2O_3$ and Zr.

Aspect (11) pertains to the light diffusing optical fiber of Aspect (10), wherein the particles comprise particles of $TiO_2$.

Aspect (12) pertains to the light diffusing optical fiber of any one of Aspects (1) through (11), wherein the scattering layer comprises a polymer matrix and scattering particles embedded within the polymer matrix of the scattering layer, wherein the polymer matrix of the scattering layer is formed from a polymer material that is different from a polymer material of the polymer matrix of the light converting layer.

Aspect (13) of this disclosure pertains to a light diffusing device comprising: a core formed from a silica-based glass; a scattering layer surrounding the core; and a light converting layer surrounding the scattering layer, the light converting layer comprising a polymer matrix and a luminophore; wherein the luminophore is configured to emit light in response to absorption of an input light; wherein a radial thickness of the light converting layer is 150 µm to 450 µm; and wherein the light converting layer comprises between 2.5% and 15% luminophore.

Aspect (14) pertains to the light diffusing device of Aspect (13), configured to be optically coupled to a light source and to generate an output light in response to input light received from the light source, wherein the emitted light has a peak wavelength between 600 nm and 640 nm, and color of the output light as measured by the CIE 1931 x, y chromaticity space, comprises x from 0.6 to 0.73, y from 0.25 to 0.35.

Aspect (15) pertains to the light diffusing device of Aspect (13) or Aspect (14), wherein the light converting layer has a thickness of 200 µm to 400 µm.

Aspect (16) pertains to the light diffusing device of any one of Aspects (13) through (15), wherein the luminophore is a nitride phosphor material.

Aspect (17) pertains to the light diffusing optical fiber of any one of Aspects (13) through (16), wherein the light converting layer comprises 5-10 vol % luminophore.

Aspect (18) pertains to the light diffusing device of any one of Aspects (13) through (17), wherein the light converting layer comprises a scattering material dispersed within the polymer matrix.

Aspect (19) pertains to the light diffusing device of Aspect (18), wherein the scattering material of the light converting layer comprises a plurality of particles within the polymer matrix.

Aspect (20) pertains to the light diffusing device of Aspect (19), wherein the particles comprise particles of at least one of $TiO_2$, ZnO, $SiO_2$, BaS, MgO, $Al_2O_3$ and Zr.

Aspect (21) pertains to the light diffusing device of Aspect (19), wherein the particles comprise particles of $TiO_2$.

Aspect (22) pertains to the light diffusing device of any one of Aspects (13) through (21), wherein the scattering layer comprises a polymer matrix and scattering particles embedded within the polymer matrix of the scattering layer, wherein the polymer matrix of the scattering layer is formed from a polymer material different from a polymer material of the polymer matrix of the light converting layer.

Aspect (23) of this disclosure pertains to a lighting system comprising: a light source generating input light having a peak wavelength less than 500 nm; and a light diffusing optical fiber according to any one of Aspects (1) through (12) or a light diffusing device of any one of Aspects (13) through (22), optically coupled to the light source.

Aspect (24) of this disclosure pertains to a lighting system comprising: a light source generating input light having a peak wavelength less than 500 nm; and a light diffusing optical fiber generating output light in response to the input light, the light diffusing optical fiber comprising: a core formed from a silica-based glass; a scattering layer surrounding the core; and a light converting layer surrounding the scattering layer, the light converting layer comprising a polymer matrix and a luminophore; wherein the light diffusing optical fiber is optically coupled to the light source such that input light generated by the light source is carried to the light converting layer; wherein the luminophore is configured to emit light in response to absorption of the input light, the emitted light having a peak wavelength greater than the peak wavelength of the input light; wherein a color of the output light as measured by the CIE 1931 x, y chromaticity space, comprises x from 0.55 to 0.75, y from 0.15 to 0.4.

Aspect (25) pertains to the lighting system of Aspect (24), wherein the emitted light has a peak wavelength between 600 nm and 640 nm, and color of the output light as measured by the CIE 1931 x, y chromaticity space, comprises x from 0.6 to 0.73, y from 0.25 to 0.35.

Aspect (26) pertains to the lighting system of Aspect (24) or Aspect (25), wherein the light converting layer has a radial thickness of 150 µm to 450 µm.

Aspect (27) pertains to the lighting system of any one of Aspects (24) through (26), wherein the light converting layer has a radial thickness of 200 µm to 400 µm.

Aspect (28) pertains to the lighting system of any one of Aspects (24) through (27), wherein the luminophore is a nitride phosphor material.

Aspect (29) pertains to the lighting system of any one of Aspects (24) through (28), wherein the light converting layer comprises between 2.5 vol % and 15 vol % luminophore.

Aspect (30) pertains to the lighting system of any one of Aspects (24) through (28), wherein the light converting layer comprises 5-10 vol % luminophore.

Aspect (31) pertains to the lighting system of any one of Aspects (24) through (30), wherein the light converting layer comprises a scattering material dispersed within the polymer matrix.

Aspect (32) pertains to the lighting system of Aspect (31), wherein the scattering material of the light converting layer comprises a plurality of particles within the polymer matrix.

Aspect (33) pertains to the lighting system of Aspect (32), wherein the particles comprise particles of at least one of $TiO_2$, ZnO, $SiO_2$, BaS, MgO, $Al_2O_3$ and Zr.

Aspect (34) pertains to the lighting system of Aspect (31), wherein the peak wavelength of the input light generated by the light source is 440 nm to 460 nm, wherein the scattering material comprises particles of $TiO_2$.

Aspect (35) pertains to the lighting system of Aspect (31), wherein the peak wavelength of the input light generated by the light source is 400 nm to 410 nm, wherein the scattering material is selected from the group consisting of particles of $SiO_2$ and Zr.

Aspect (36) pertains to the lighting system of any one of Aspects (24) through (35), wherein the scattering layer comprises a polymer matrix and scattering particles embedded within the polymer matrix of the scattering layer, wherein the polymer matrix of the scattering layer is formed from a polymer material different from a polymer material of the polymer matrix of the light converting layer.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A light diffusing optical fiber configured to be optically coupled to a light source and to generate an output light in response to input light received from the light source, the light diffusing optical fiber comprising:
   a silica-based glass core;
   a scattering layer surrounding the core; and
   a light converting layer surrounding the scattering layer, the light converting layer comprising a polymer matrix and a luminophore within the polymer matrix;
   wherein the luminophore is configured to emit light in response to absorption of an input light, the emitted light having a peak wavelength between 580 nm and 680 nm;
   wherein a color of the output light as measured by the CIE 1931 x, y chromaticity space, comprises x from 0.55 to 0.75, y from 0.15 to 0.4, wherein the scattering layer comprises a polymer matrix and scattering particles embedded within the polymer matrix of the scattering layer, wherein the polymer matrix of the scattering layer is formed from a polymer material different from a polymer material of the polymer matrix of the light converting layer.

2. The light diffusing optical fiber of claim 1, wherein the emitted light has a peak wavelength between 600 nm and 640 nm, and color of the output light as measured by the CIE 1931 x, y chromaticity space, comprises x from 0.6 to 0.73, y from 0.25 to 0.35.

3. The light diffusing optical fiber of claim 1, wherein the light converting layer has a radial thickness of 150 µm to 450 µm.

4. The light diffusing optical fiber of claim 1, wherein the luminophore is a nitride phosphor material.

5. The light diffusing optical fiber of claim 1, wherein the light converting layer comprises between 2.5 vol % and 15 vol % luminophore.

6. The light diffusing optical fiber of claim 1, wherein the light converting layer comprises a scattering material dispersed within the polymer matrix.

7. A light diffusing device comprising:
   a core formed from a silica-based glass;
   a scattering layer surrounding the core; and
   a light converting layer surrounding the scattering layer, the light converting layer comprising a polymer matrix and a luminophore;
   wherein the luminophore is configured to emit light in response to absorption of an input light;
   wherein a radial thickness of the light converting layer is 150 µm to 450 µm; and
   wherein the light converting layer comprises between 2.5% and 15% luminophore; and wherein the scattering layer comprises a polymer matrix and scattering particles embedded within the polymer matrix of the scattering layer, wherein the polymer matrix of the scattering layer is formed from a polymer material different from a polymer material of the polymer matrix of the light converting layer.

8. The light diffusing device of claim 7 configured to be optically coupled to a light source and to generate an output light in response to input light received from the light source, wherein the emitted light has a peak wavelength between 600 nm and 640 nm, and color of the output light as measured by the CIE 1931 x, y chromaticity space, comprises x from 0.6 to 0.73, y from 0.25 to 0.35.

9. The light diffusing device of claim 7, wherein the light converting layer has a thickness of 200 μm to 400 μm.

10. The light diffusing optical fiber of claim 7, wherein the luminophore is a nitride phosphor material.

11. The light diffusing optical fiber of claim 7, wherein the light converting layer comprises 5-10 vol % luminophore.

12. The light diffusing optical fiber of claim 7, wherein the light converting layer comprises a scattering material dispersed within the polymer matrix.

13. The light diffusing device of claim 7, further comprising:
   a light source generating input light having a peak wavelength less than 500 nm wherein the light diffusing device is optically coupled to the light source.

14. A lighting system comprising:
   a light source generating input light having a peak wavelength less than 500 nm; and
   a light diffusing optical fiber generating output light in response to the input light, the light diffusing optical fiber comprising:
      a core formed from a silica-based glass;
      a scattering layer surrounding the core; and
      a light converting layer surrounding the scattering layer, the light converting layer comprising a polymer matrix and a luminophore;
   wherein the light diffusing optical fiber is optically coupled to the light source such that input light generated by the light source is carried to the light converting layer;
   wherein the luminophore is configured to emit light in response to absorption of the input light, the emitted light having a peak wavelength greater than the peak wavelength of the input light;
   wherein a color of the output light as measured by the CIE 1931 x, y chromaticity space, comprises x from 0.55 to 0.75, y from 0.15 to 0.4; and wherein the scattering layer comprises a polymer matrix and scattering particles embedded within the polymer matrix of the scattering layer, wherein the polymer matrix of the scattering layer is formed from a polymer material different from a polymer material of the polymer matrix of the light converting layer.

15. The lighting system of claim 14, wherein the emitted light has a peak wavelength between 600 nm and 640 nm, and color of the output light as measured by the CIE 1931 x, y chromaticity space, comprises x from 0.6 to 0.73, y from 0.25 to 0.35.

16. The lighting system of claim 15, wherein the peak wavelength of the input light generated by the light source is 400 nm to 410 nm, wherein the scattering material is selected from the group consisting of particles of $SiO_2$ and Zr.

17. The lighting system of claim 14, wherein the light converting layer has a radial thickness of 150 μm to 450 μm.

18. The lighting system of claim 14, wherein the luminophore is a nitride phosphor material.

19. The lighting system of claim 14, wherein the light converting layer comprises between 2.5 vol % and 15 vol % luminophore.

* * * * *